Dec. 24, 1940.   H. B. LEWIS ET AL   2,225,914
MOTOR VEHICLE
Filed April 19, 1938   3 Sheets-Sheet 1
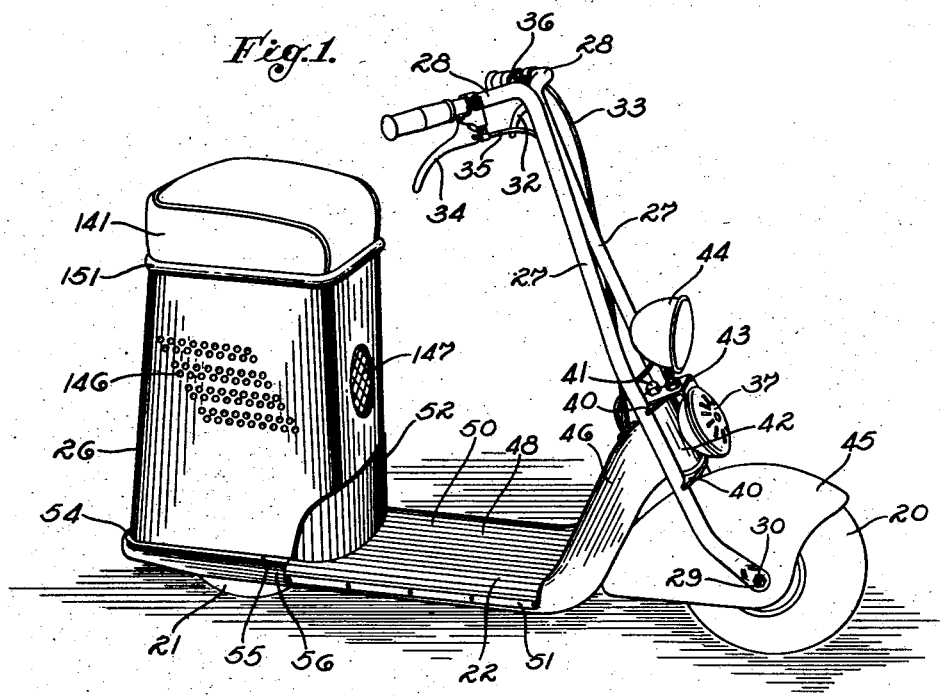
INVENTORS
HOWARD B. LEWIS
BRUCE BURNS
AUSTIN E. ELMORE
ESLEY F. SALSBURY
BY HARRIS, KIECH, FOSTER & HARRIS
ATTORNEYS.

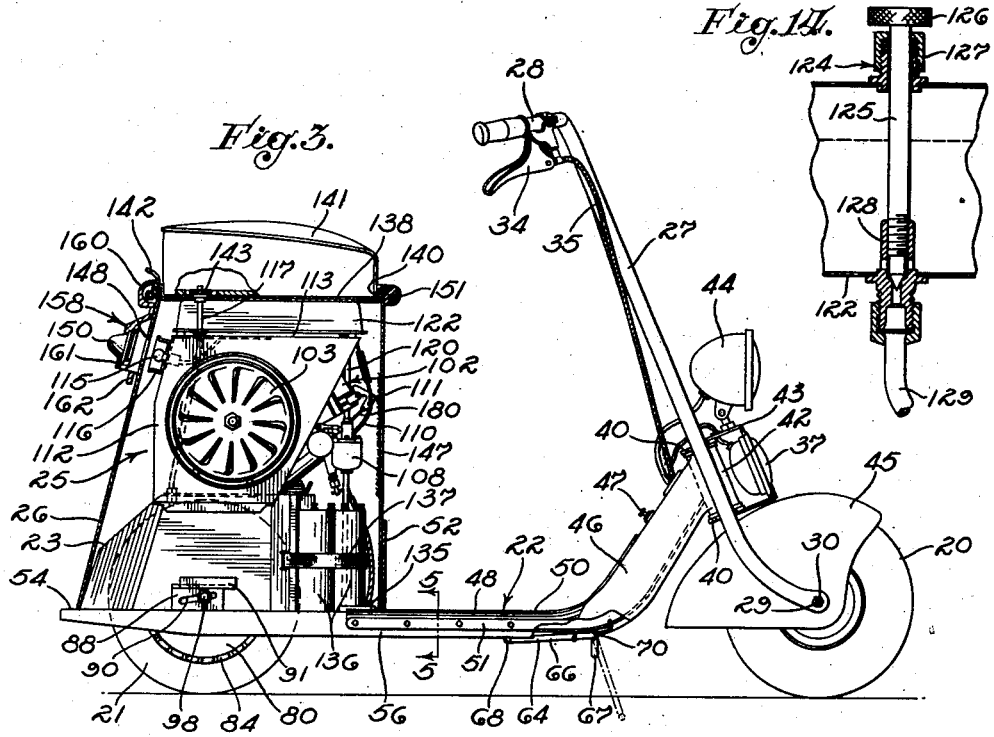
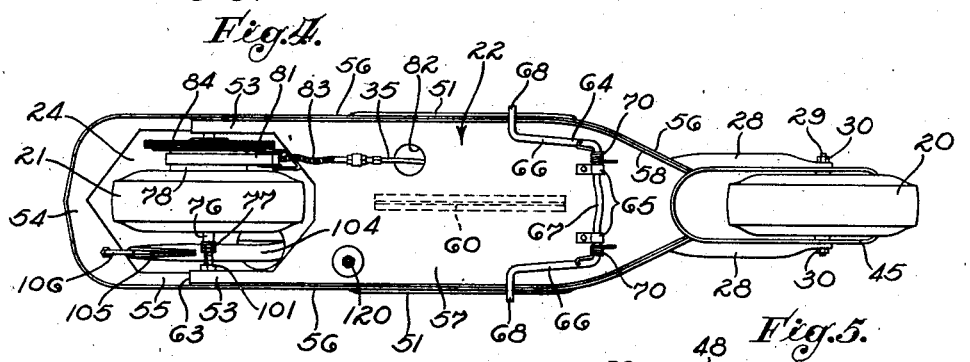
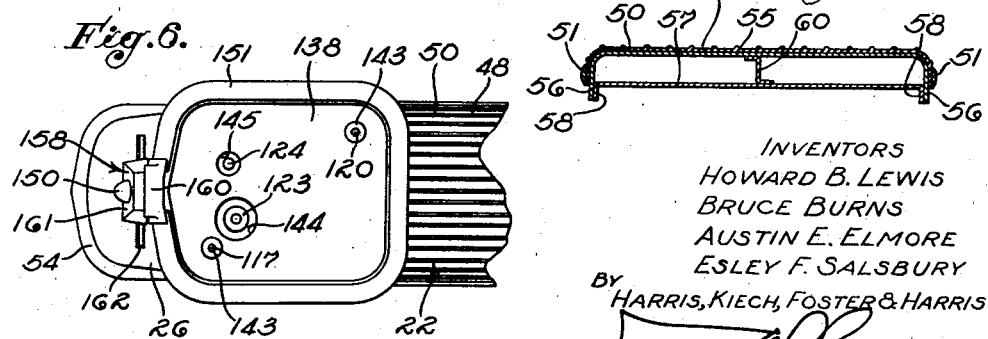

Dec. 24, 1940.  H. B. LEWIS ET AL  2,225,914
MOTOR VEHICLE
Filed April 19, 1938  3 Sheets-Sheet 3
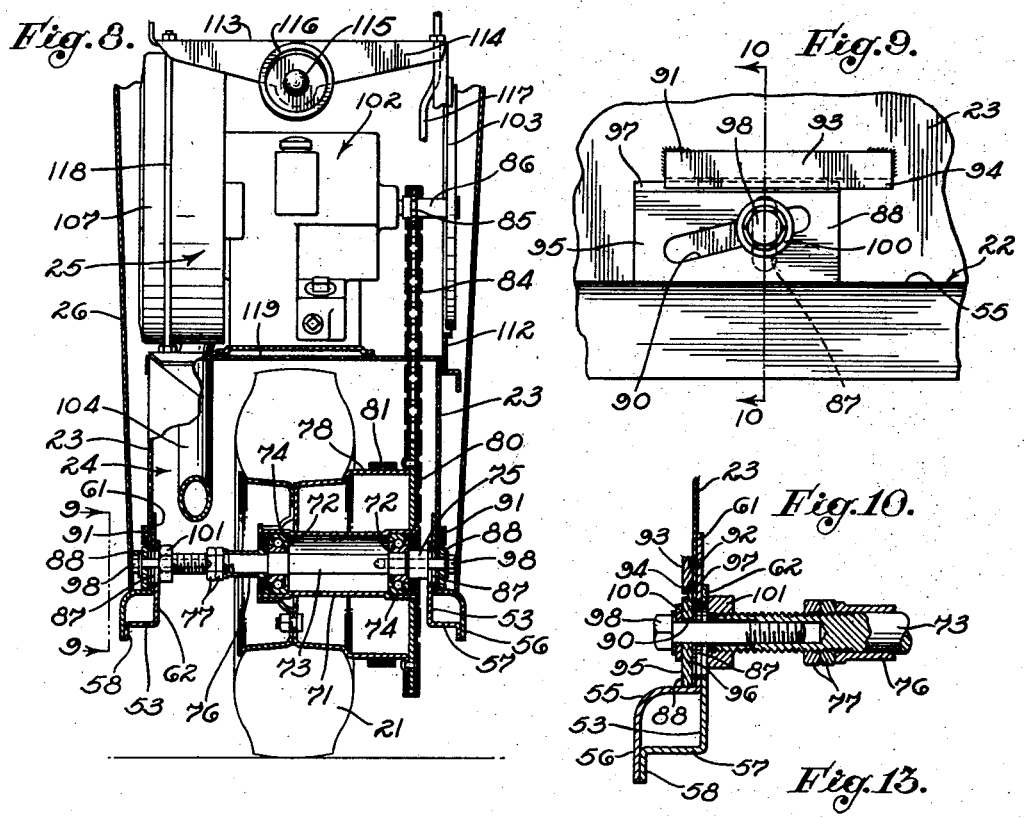
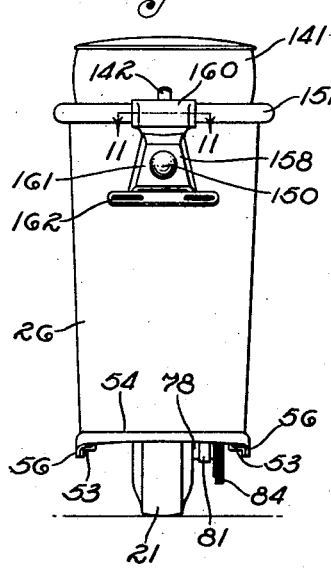
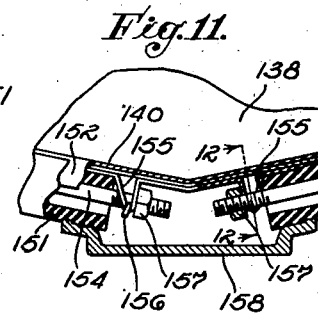
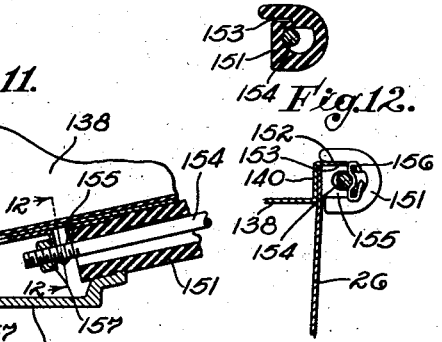
INVENTORS
HOWARD B. LEWIS
BRUCE BURNS
AUSTIN E. ELMORE
ESLEY F. SALSBURY
BY HARRIS, KIECH, FOSTER & HARRIS
ATTORNEYS.

Patented Dec. 24, 1940

2,225,914

UNITED STATES PATENT OFFICE 2,225,914

MOTOR VEHICLE

Howard B. Lewis, Venice, Bruce Burns, Santa Monica, Austin E. Elmore, Alhambra, and Esley F. Salsbury, Los Angeles, Calif., assignors to Salsbury Corporation, Inglewood, Calif., a corporation of California Application April 19, 1938, Serial No. 202,868

7 Claims. (Cl. 180—33)

Our invention relates to motor vehicles and is particularly directed to improvements in a vehicle of the self-propelled scooter type having a single steering wheel in front and one or two rear wheels. The vehicle may be termed a "motor glide."

A vehicle of the type involved is characterized by a relatively low frame that supports the power unit of the vehicle and a seat for the operator. The frame extends close to the ground to serve as a foot-rest when the operator uses the seat and to serve as a running-board on which the operator may stand.

Certain features of our invention are found in the construction of this frame. Thus, one of our objects is to provide a rigid frame of hollow or box-like construction fabricated from relatively light sheet metal. A further object in mind is to extend such a frame around the rearward wheel means of the vehicle with an inverted casing or hood on the frame forming a well for the wheel means. We also propose to combine with the frame a novel form of parking stand operable from either side of the vehicle and adapted to be retracted automatically by forward movement of the vehicle.

Other features of our invention relate to the arrangement of the power unit and the seat with respect to the aforementioned frame. Our general object, in such regard, is to provide a light, efficient, and compact body assembly of pleasing appearance and economical construction. More specifically, one of our objects is to mount the power unit on the aforementioned inverted casing or hood with a seat thereabove, and to provide a conveniently removable hood or outer casing of pleasing appearance for enclosing the power unit and the inverted casing. Another object is to provide such an arrangement in which the seat is supported by such a hood. By providing a hood of the character indicated supported by the frame in a removable manner, we are enabled to achieve certain further purposes, including the provision of a fuel tank accessible through the hood upon removal of the seat, and the provision of a fuel cut-off valve normally concealed by the seat. Another of these further purposes is to provide a tail-light construction in which the lamp element is fixedly related to the frame inside the hood, with the lamp or colored light-transmitting means carried by the removable hood.

Since a vehicle of the scooter type, especially one having only a single rear wheel, may occasionally be permitted by accident to fall over on its side, one of our objects is to provide a suitable bumper preferably of a shock-absorbing character on the body to absorb the shock of falls. We propose to mount such cushioning means on the hood of the vehicle in the form of a flexible elongated resilient member extending at least partially around the hood. In the preferred form of the invention, our object is to extend this resilient member around the rim of the hood below the seat to serve not only as means to absorb the shock of a fall, but also as means to cushion the metal rim of the hood for the sake of the driver.

Objects of our invention relating more specifically to the construction of this bumper will be apparent in our detailed description below.

One of the features of our invention is a novel fork construction for carrying and steering the front wheel of the vehicle, our object being to achieve a simple structure of pleasing appearance and exceptional strength.

In a vehicle of the type involved here, certain problems are encountered in designing a rear wheel mounting, especially if the rear wheel is driven by a sprocket chain or belt. The wheel must be mounted in a positive manner for safe driving, yet must be readily removable for tire changing, and must also be adjustable for tightening or loosening its engagement with the drive means. One of the objects of our invention is to meet these problems by a novel form of adjustable axle mounting.

Various other objects and advantages of our invention may be understood by reference to the following description considered with the accompanying drawings.

In the drawings:

Fig. 1 is a perspective view of the motor vehicle;

Fig. 2 is a front view of the fork assembly with the rest of the vehicle indicated by dotted lines;

Fig. 3 is a side elevation of the motor vehicle with the hood shown in section to reveal the motor assembly encased therein;

Fig. 4 is a bottom view of the vehicle;

Fig. 5 is a section taken along the line 5—5 of Fig. 3;

Fig. 6 is a plan view of the rear of the motor vehicle with the seat removed;

Fig. 7 is a rear view of the motor vehicle;

Fig. 8 is an enlargement of a portion of Fig. 7 with the hood and certain parts shown in section;

Fig. 9 is an enlarged detail taken as indicated by the line 9—9 of Fig. 8;

Fig. 10 is a section of Fig. 9 taken along the line 10—10;

Fig. 11 is an enlarged sectional detail taken as indicated by the line 11—11 of Fig. 7;

Fig. 12 is a section taken as indicated by the line 12—12 of Fig. 11;

Fig. 13 is a cross-section of the bumper member shown in Fig. 11;

Fig. 14 is a cross-sectional detail showing the construction of a shut-off valve for the fuel line; and Fig. 15 is a detail showing the construction of a compression release associated with the carburetor control.

The motor glide, shown with a front wheel 20 and a rear wheel 21, has a body that includes a relatively low frame 22 extending between the wheels, an inner casing 23 that both forms a well 24 over the rearward wheel 21 and supports above the wheel a motor assembly generally designated by the numeral 25, and, finally the body includes a hood 26 that normally conceals the inner casing 23 and the motor assembly 25.

The fork assembly comprises two interconnected tubular members 27 that are bent at the top to form diverging handle-bars 28 and are spaced apart at the bottom to receive the ends of a front axle 29 secured by nuts 30. Mounted on the handle-bars 28 may be a motor-control lever 32 connected with the power unit of the vehicle by a cable concealed in a tube 33, a brake-control lever 34 for actuating a brake by means of a cable concealed in a tube 35, and a button 36 for energizing a horn 37.

In the construction shown in the drawings, the two tubes 27 are joined together near the handle-bars by a connecting member 38, and are joined together above the front wheel by a pair of transverse plates or bearing supports 40, between which supports is secured one of the cooperating bearing means for rotatably relating the fork assembly to the vehicle frame 22. In the particular construction chosen for illustration, the bearing member mounted between the supports 40 is a king bolt 41 that is journalled in a suitable bearing means 42 built into the forward end of the frame 22. The two bearing supports 40 may also support a bracket 43, on which is mounted the horn 37 and a headlight 44. Below the bracket a hood-like fender or mud-guard 45 may be mounted over the wheel 20.

The frame 22 includes a forward inclined portion 46 that may be regarded as a dash, the drawings showing a headlight switch 47 mounted thereon, and also includes an intermediate, substantially horizontal portion 48 that serves as a foot-rest or running-board. The running-board 48 may be covered with a rubber mat 50 secured at the sides by metal strips 51, and a protective layer 52 of similar material may cover adjacent areas of the hood 26. The frame 22 also includes two extensions 53 on either side of the rear wheel 21, and may include a further extension or platform 54 across the rear of the wheel.

A feature of the preferred form of our invention shown in the drawings is a box-like construction for the frame 22 by virtue of which the strength and rigidity required are achieved with lightness of weight and economy of material. The major portion of the frame consists of a top plate 55, formed with downwardly extending side flanges 56, and a lower plate 57 having short flanges 58 for connection with the flanges 56 of the top plate, as may be understood by referring particularly to Fig. 5. For additional strength, one or more web members 60 may interconnect the two plates centrally, as shown in Figs. 4 and 5. The top plate 55 of the frame 22 extends back of the wheel 21 to provide the platform 54 at the rear of the vehicle and is flanged upward to define the bottom of the well 24. To form portions of the hollow extensions 53 of the frame 22, the top plate 55 is formed as shown in Fig. 10 with substantial upwardly extending flanges 61. The hollow extensions 53 are completed by the bottom plate 57, this bottom plate having vertical flanges 62 lying against the flanges 61, as shown in Fig. 10, the two flanges being secured together and to the inner casing 23. Since the maximum strength in the frame 22 is required between the front and rear wheels, it is not necessary to carry the hollow construction to the end of the rear platform 54, and we may terminate the bottom plate 57 just back of the axis of the rear wheel 21, the rear edge of the plate being shown at 63 in Fig. 4.

For holding the vehicle upright when it is stationary, any suitable stand may be employed. We prefer to provide a stand that will swing downward and forward under the vehicle to lift the front end of the frame to an elevated position, so that the stand will be moved to retracted position automatically by forward movement of the vehicle. Such a stand, as shown in Figs. 3 and 4, may comprise a rod 64 rotatably mounted on the bottom of the frame 22 by a pair of clips 65, the rod being bent to form two legs 66 and an intermediate offset or loop 67. The ends 68 of the legs 66 are bent to extend laterally beyond the side edges of the frame 22, so that the operator may swing the stand downward with either foot against the yielding action of a pair of springs 70. When the stand is in its effective position, as indicated by the dotted lines in Fig. 3, the loop 67 rests against the bottom of the frame 22.

The rear wheel 21 has an inner axial cylinder 71 embracing a pair of spaced bearings 72, by means of which the wheel is mounted on an axle 73. The inner faces of the two bearings 72 engage annular shoulders 74 formed in the cylinder 71, the outer face of one bearing engaging a shoulder formed by an enlargement 75 at one end of the axle, and the outer face of the other bearing engaging a retaining sleeve 76. The sleeve 76 embraces the axle and is removably secured thereon by nuts 77 in threaded engagement with the axle. Integral with the wheel 21 is a brake drum 78 and a sprocket 80. A brake band 81 that cooperates with the drum 78 is operated by a cable from the control lever 34, as previously explained. As shown in Fig. 4, the tube 35 containing this cable passes to the bottom of the frame 22 through an aperture 82, the cable then extending through a helical spring 83 between the end of the tube 35 and the brake band 81.

The wheel 21 is driven by a sprocket chain 84 that interconnects the sprocket 80 and a smaller sprocket 85 on a drive shaft 86. One of the features of our invention is a novel construction that permits adjustment of the axle 73 for tightening or loosening the chain 84. This construction is characterized by the combination of two slotted plates in engagement with the axle, one of the plates having a slot aligned in the general direction in which the chain is disposed, the other plate having a slot intersecting the slot of the first plate, whereby movement of one of the plates relative to the other causes the axle to shift along the first slot. The construction may be understood in detail by referring to Figs. 8, 9, and 10.

Substantially vertical slots 87 are cut in the walls of the well 24 on opposite sides of the wheel 21, the slots extending through the material of the wall of the inner casing 23 and also through the material of the flanges 61 and 62, as best shown in Fig. 10. These slots, it will be noted, extend in the general direction of the chain, i. e., point in the general direction of the drive shaft 86. Adjacent each of the vertical slots 87 and on the outside wall of the inner casing 23, is slidingly mounted a plate means 88 having an inclined slot 90 intersecting the vertical slots 87. To prevent vertical movement of the plate means 88, it may have its lower edge resting on the top plate 55 of the frame 22 and may have its top edge abutting a guide means 91 that is secured, as by welding, to the exterior of the inner casing 23. In the preferred form of our invention the guide means 91 comprises two thicknesses of metal, the outer thickness 93 extending below the inner thickness 92 to provide a downwardly extending flange 94; and the plate means 88 likewise comprises two similar thicknesses of metal with the inner thickness 96 extending above the outer thickness 95 to provide a flange 97 for sliding engagement with the flange 94.

At each end of the axle 73 a cap screw 98 threaded into the end of the axle extends through slots 87 and 90 at the intersection of the slots, so that longitudinal movement of the plate means 88 causes the ends of the shaft to move upward or downward in alignment with the vertical slots 87. Thus, to loosen the drive chain 84, the plate means 88 on each side of the vehicle is driven in one direction, and to tighten the chain, the plate means is shifted in the opposite direction. The axle may be held at any desired position within the range of the slots 87 by simply tightening down the two cap screws, suitable washers 100 being employed with the cap screws. One of the cap screws 98 presses the wall of the inner casing 23 against the enlarged end 75 of the axle. Since the threaded end of the axle is of lesser diameter, a nut 101 may be threaded thereon to cooperate with the other cap screw. By virtue of this construction, the drive chain 84 may be readily slackened or tightened, or the wheel 21 may be dismounted in a convenient manner for tire changing.

The motor assembly 25 of the preferred form of our invention includes a single cylinder internal combustion engine 102 from which extends the aforementioned drive shaft 86. A suitable fan 103 is shown on the end of the drive shaft. An exhaust pipe 104 extends downward from the engine through the well 24 and terminates in a muffler portion 105 anchored by a bolt 106 (Fig. 4). At one side of the engine, concealed in a casing 107, are a fly-wheel and magneto (not shown), the fly-wheel being equipped with fan blades in a well known manner to help cool the motor assembly. The carburetor 108 of the engine is controlled, as previously noted, by the lever 32 on one of the handle-bars, Fig. 3 showing a portion 110 of the cable and a small bell-crank 111 included in the control linkage.

Extending upward from one side of the inner casing 23 is a plate 112 apertured to clear the fan 103, the plate being bent over to form a shelf 113 and a rear flange 114. The purpose of the flange 114 is to carry a lamp 115 in a reflector 116 for the tail-light of the vehicle. The shelf 113 is supported by two rearward rods 117 and 118 extending upward from the inner casing 23, and by a third forward rod 120 that is anchored in the bottom of the frame 22, as indicated in Fig. 4. The rods 117 and 120 have threaded ends extending upward above the shelf 113 at opposite sides of a fuel tank 122 that is mounted on the shelf.

The fuel tank is provided with a fill closure 123 and a valve 124 that may be manipulated to cut off the fuel flow from the tank to the carburetor 108. The valve 124 may be in the form of a needle valve, as indicated by Fig. 14. The valve includes a stem 125 with a knurled head 126, the stem extending through a gland 127 at the top of the tank and being threaded into a fitting 128 at the bottom of the tank. The fitting 128 serves as a tank outlet draining into a fuel pipe 129 and provides a tapered seat for the tapered end of the valve stem.

The previously mentioned hood 26 is of box-like construction with an open bottom that normally rests on the frame 22 in engagement with spaced flanges 135 formed in the top plate 55 of the frame 22, one of the flanges being indicated in Fig. 3. The hood extends forward from the inner casing 23 providing an enclosed space on the frame 22 for dry batteries 136 that are normally held in place by a suitable strap 137.

The top 138 of the hood 26 is recessed to provide a flange 140 for retaining a suitable seat means, such as a cushion 141. Preferably, the seat will be provided with a releasable retaining means such as a latch 142. The upper ends of the rods 117 and 120 extend through suitable apertures in the top 138 of the hood to receive thumb-nuts 143 for engaging the top of the hood, thereby to anchor the hood in assembled position. It will be noted in Fig. 6 that the top of the hood is provided with an aperture 144 for access to the fill closure 123 and a second aperture 145 providing access to the fuel valve 124. When the seat 141 is in position it conceals the thumb-screws 143, the fill closure 123, and the fuel valve 124. The hood will, of course, be suitably apertured to permit ventilation of the motor assembly, the drawings showing perforations 146 and a screened opening 147 for such purpose. The hood will also be provided with an opening 148 normally registering with the reflector 116 for passage of light from the lamp 115, the hood carrying a colored lens 150 in the path of the light.

Since a two-wheel vehicle is apt to be injured by falling over sidewise, some type of bumper means is desirable for absorbing the impact of the vehicle body with the ground. In the preferred form of our invention the bumper is an elongated resilient member 151 and extends around the hood 26, protruding laterally therefrom sufficiently to strike the ground first. A suggested construction for such a bumper is best shown in Figs. 11, 12, and 13.

As an anchorage for the bumper, the hood provides an outwardly extending metal rim flange 152 which is engaged by a slot 153 of the bumper member. The bumper member is made of rubber, or other resilient material, and is of hollow construction to receive a flexible retaining means such as a wire 154. The two ends of the bumper are separated by a gap at the rear of the hood, as indicated by Fig. 11. Any convenient means may be employed for releasably anchoring the two ends of the wire 154 to the hood in this gap. For example, sheet metal clips 155 may be notched out to provide saddles for receiving the wire 154, the wire 154 being held against the clips by small wire loops 156. The two ends of the wire 154 are adjustably anchored by nuts 157 threaded on the ends of the wire in engagement with the clips 155.

Finally, an ornamental member 158 may be bolted to the back of the hood, the ornamental member having an upper portion 160 concealing the gap at the ends of the bumper, an intermediate portion 161 for holding the lens 150, and a lower portion 162 formed as a bracket for a license plate. The upper portion 160 of the ornamental member may serve not only as means for releasable engagement by the seat latch 142, as indicated by the drawings, but also as a convenient handhold for lifting the machine.

In the preferred form of our invention, a compression release is interlocked with the carburetor control in a manner, for example, indicated in Fig. 15. The head 165 of the engine cylinder has a boss 167 in which is formed a passage 168 terminating in a tapered valve seat 170. A poppet valve member 171, having a stem 172 extending through the boss 167, is urged by a suitable spring 173 toward closed position. The outer end of the stem 172 is in a position to be engaged by an arm 174 of the previously mentioned bell-crank 111 that forms a link in the throttle-control mechanism. The bell-crank is pivoted at 175 and is acted upon by a helical spring 177 that tends to move the bell-crank to a position to compress the spring 173, the spring 177 being the stronger of the two springs. The previously mentioned cable 110 from the handle-bar control is adjustably connected to the bell-crank 111 by a screw 178, the surplus portion 179 of the cable being conveniently extended into the spring 177. The bell-crank 111 is operatively connected with the carburetor throttle by means including a light rod 180.

In the inoperative positions of the various parts when no pressure is exerted against the control lever 32 on the handle-bar, the bell-crank 111 is in the position indicated by full lines in Fig. 15, the arm 174 holding the compression-release valve open. As soon as the operator presses the control lever 32 to open the throttle of the carburetor, the bell-crank 111 is moved toward the dotted line position of Fig. 5, releasing the poppet valve to be closed by action of the spring 173. This arrangement permits the operator to start the engine by first pushing the vehicle forward with the compression-release valve open and then, after the fly-wheel has gained momentum, simultaneously closing the compression-release valve and introducing fuel into the engine by simply pressing the control lever 32.

Several advantages flow from the special form of hood 26 used in the form of our invention previously described. It should be borne in mind that the utility of this device depends, to a large measure, on cheapness of construction and compactness. As will be seen from the drawings, the hood 26 rests entirely upon the frame 22 on the spaced flanges 135. As will be seen from the drawings, it is in effect a box enclosing the mechanism, and upon raising it vertically it can be taken off without in any way interfering with the mechanism, so that the mechanism can be operated for test or inspection with the hood removed. The hood is secured in place by the thumb-nuts 143 which are on top of the hood and readily accessible when the cushion 141 is removed.

The hood, however, serves a dual purpose in that it not only provides an enclosure for the mechanism, but also provides a seat for the user. By so using the hood as a user support, not only is a very firm and rigid seat provided, but the vehicle is made very compact. Its width is increased by only two thicknesses of thin metal plus a little clearance and its other dimensions need not be materially increased to provide a seat support.

We have described specific embodiments of the various features of our invention in detail for the purpose of disclosure and to illustrate the principles involved in our inventive concept. These specific embodiments will suggest to those skilled in the art various changes and modifications that do not depart from the spirit of the invention. We reserve the right to all such changes and modifications that fall within the scope of our appended claims.

We claim as our invention:

1. In a motor vehicle, the combination of: a frame having its upper surface parallel to the ground when the vehicle is in an upright position; a rear wheel having its axis parallel to said surface; driving means including a motor supported on said frame above said wheel; a hood wholly supported on and detachably secured to said frame and enclosing a portion of said wheel and all of said driving means and so shaped as to be vertically removable without interfering in any way with the operation of the other parts of said vehicle; and a cushion upon which the operator may sit resting upon the top of said hood and closing an opening through which an operator may have access to said fuel tank.

2. In a motor vehicle, the combination of: a frame; mechanism assisting in driving said vehicle, the weight of said mechanism being supported on said frame and said mechanism projecting above said frame; a hood resting on said frame and enclosing said mechanism, said hood being of sufficient strength and so formed as to support the weight of the user of said vehicle; a cushion or user-supporting member supported by said hood and closing an opening in the top of said hood, said opening being of sufficient size and so placed that the user may have access to said mechanism through said opening; and means for rigidly securing the hood in place over said mechanism.

3. In a motor vehicle, the combination of: a frame; mechanism assisting in driving said vehicle, the weight of said mechanism being supported on said frame and said mechanism projecting above said frame; a hood resting on said frame and enclosing said mechanism, said hood being of sufficient strength and so formed as to support the weight of the user of said vehicle; a cushion or user-supporting member supported by said hood and closing an opening in the top of said hood, said opening being of sufficient size and so placed that the user may have access to said mechanism through said opening; a gasoline tank supported rigidly with relation to said mechanism inside said hood when the hood is rigidly secured in place, said gasoline tank having a filling opening accessible to the user through said opening when the hood is so secured; and means for rigidly securing the hood in place over said mechanism.

4. In a motor vehicle, the combination of: a frame; an axle upon which a portion of the weight of said frame and parts carried thereby is supported; a driving wheel on said axle; an engine whose weight is supported by said frame, said engine projecting above said frame; a mechanism through which said engine drives said wheel, the weight of said mechanism being supported by said frame and said mechanism projecting above said frame; a hood resting upon and supported by said frame and enclosing said engine and mechanism; manually releasable means for securing said hood to said frame in a position enclosing said engine and mechanism; and a driver's seat supported by and removable with said hood.

5. In a motor vehicle, the combination of: a frame; an engine the weight of which is supported by said frame and which projects above said frame; mechanism through which said engine drives said vehicle, the weight of said mechanism being supported by said frame and said mechanism projecting above said frame; a hood resting upon and supported by said frame, said hood enclosing said engine and mechanism; manually releasable means for securing said hood to said frame in said position enclosing said engine and said mechanism; and a driver's seat supported by and removable with said hood.

6. In a motor vehicle, the combination of: a frame; an engine the weight of which is supported by said frame and which projects above said frame; mechanism through which said engine drives said vehicle, the weight of said mechanism being supported by said frame and said mechanism projecting above said frame; a hood resting upon and supported by said frame, said hood enclosing said engine and mechanism; manually releasable means for securing said hood to said frame in said position enclosing said engine and said mechanism; a gasoline tank supported inside said hood when said hood is so secured in said enclosing position; means through which gasoline from said tank may be conducted to said engine; and a driver's seat supported by and removable with said hood.

7. In a motor vehicle, the combination of: a frame; an engine the weight of which is supported by said frame and which projects above said frame; mechanism through which said engine drives said vehicle, the weight of said mechanism being supported by said frame and said mechanism projecting above said frame; a hood resting upon and supported by said frame, said hood enclosing said engine and mechanism; manually releasable means for securing said hood to said frame in said position enclosing said engine and said mechanism; a gasoline tank supported inside said hood when said hood is so secured in said enclosing position; means through which gasoline from said tank may be conducted to said engine; means, outside said hood and accessible to the user of the vehicle when said hood is so secured in said enclosing position, for controlling the flow of said gasoline into said engine; and a driver's seat supported by and removable with said hood.

HOWARD B. LEWIS.
BRUCE BURNS.
AUSTIN E. ELMORE.
ESLEY F. SALSBURY.